United States Patent [19]

Schofield et al.

[11] Patent Number: 5,036,977
[45] Date of Patent: Aug. 6, 1991

[54] WEB SUPPLY SYSTEMS

[75] Inventors: Paul Schofield, Heatherside; Eric Foster, Flackwell, both of England

[73] Assignee: Almex Control Systems Limited, Uxbridge, England

[21] Appl. No.: 479,540

[22] Filed: Feb. 13, 1990

[30] Foreign Application Priority Data

Feb. 14, 1989 [GB] United Kingdom ............ 8903269

[51] Int. Cl.⁵ .................................... B41J 35/28
[52] U.S. Cl. .......................... 206/389; 206/39.8
[58] Field of Search ............ 206/394, 393, 390, 389, 206/412, 39, 39.3, 39.8; 400/613; 226/118; 242/55.3, 55.42

[56] References Cited

U.S. PATENT DOCUMENTS

| | | | |
|---|---|---|---|
| 2,650,703 | 9/1953 | Hagen | 206/393 |
| 3,596,818 | 8/1971 | Curtis et al. | 226/118 X |
| 4,082,210 | 4/1978 | Gottschlich | 226/118 X |
| 4,527,722 | 7/1985 | Strachan | 242/55.3 X |
| 4,793,564 | 12/1988 | Hank et al. | 226/118 X |

FOREIGN PATENT DOCUMENTS 128127 12/1984 European Pat. Off. .

Primary Examiner—Paul T. Sewell
Assistant Examiner—Jacob K. Ackun, Jr.
Attorney, Agent, or Firm—Laurence R. Brown

[57] ABSTRACT

The invention concerns the joining of webs in adjacent cassettes, particularly as a supply for a ticket issuing machine. A web supply system comprises a plurality of cassettes (12) each containing a fan folded web (13) of material, each cassette having a common web exit and web entrance, the cassettes being arranged side by side and the leading end of a first of the webs being arranged to pass through the exit of that cassette to an operating-/issuing machine and the trailing end (19) of the web of each cassette (except the last) extending through the entrance of that cassette and being joined to the leading end (19a) of the web from the next adjacent cassette, the web extending in a loop between adjacent cassettes so that the web from all the cassettes can be supplied as a continuous web to the processing/issuing machine.

8 Claims, 4 Drawing Sheets

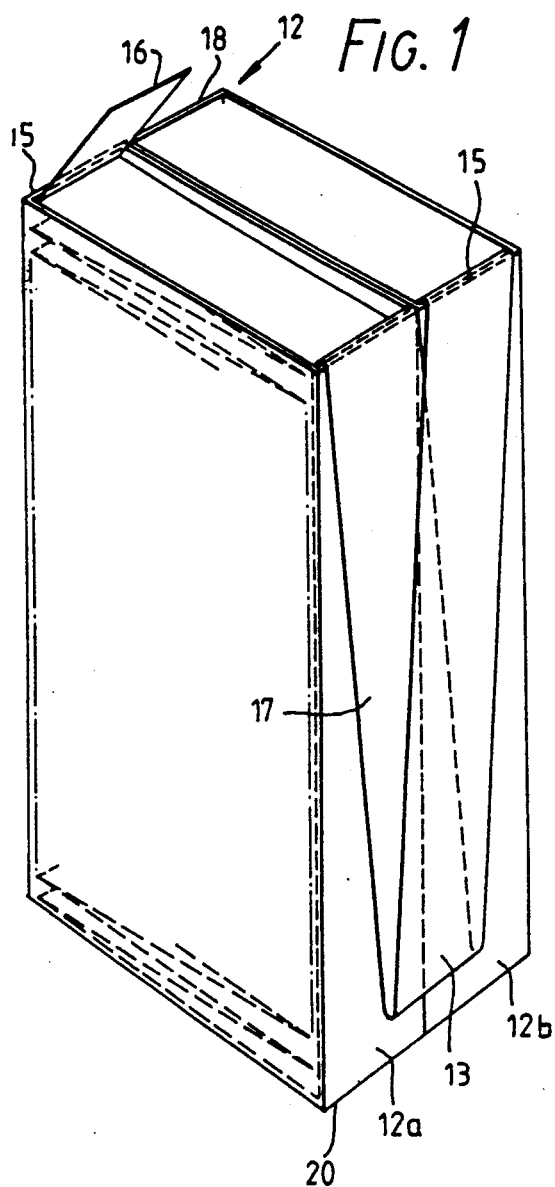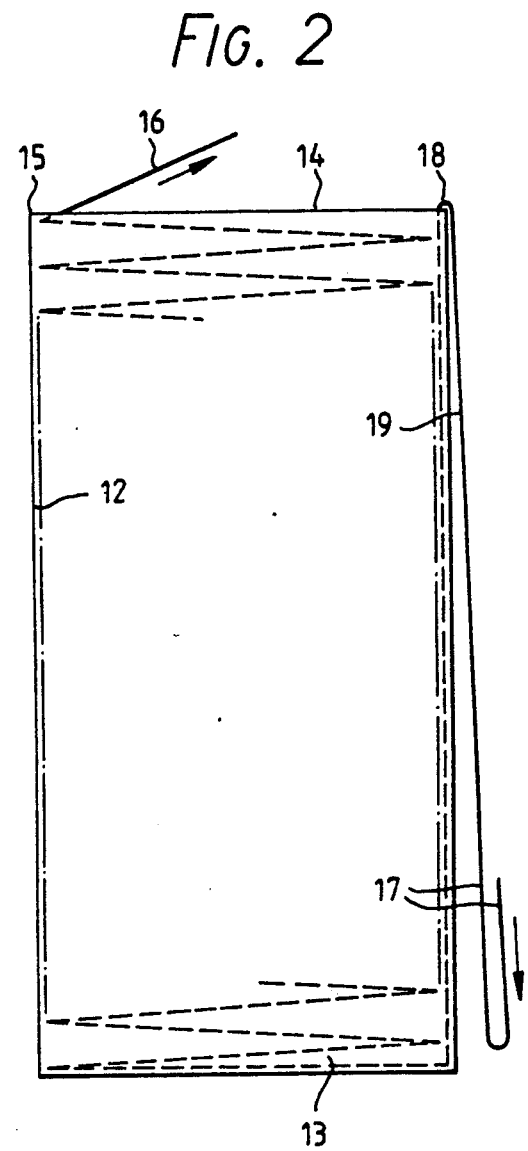

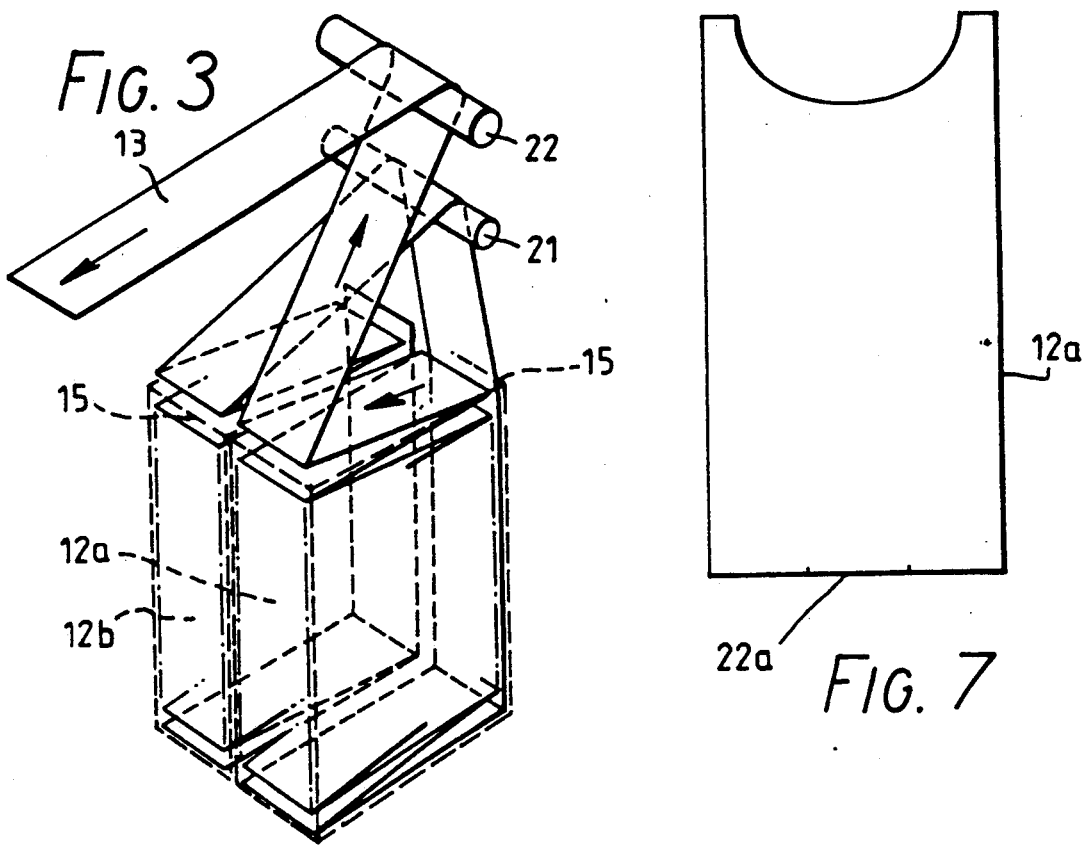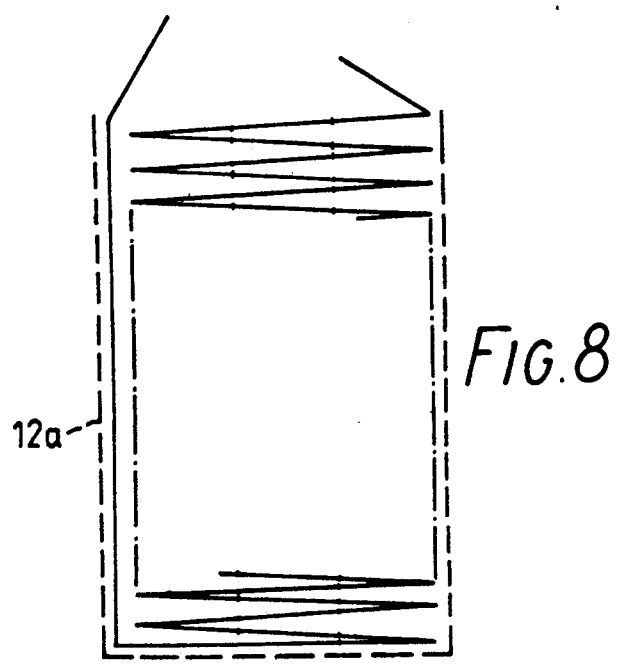

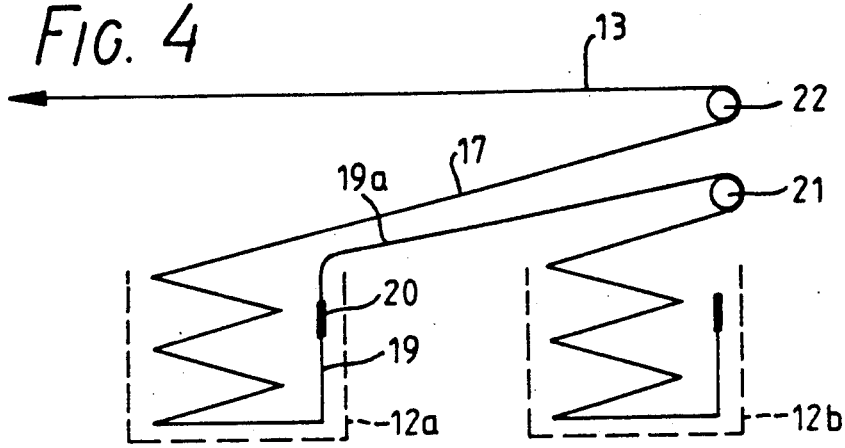
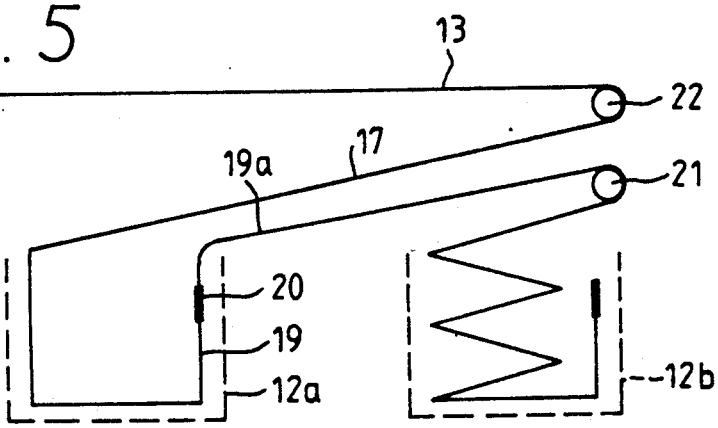
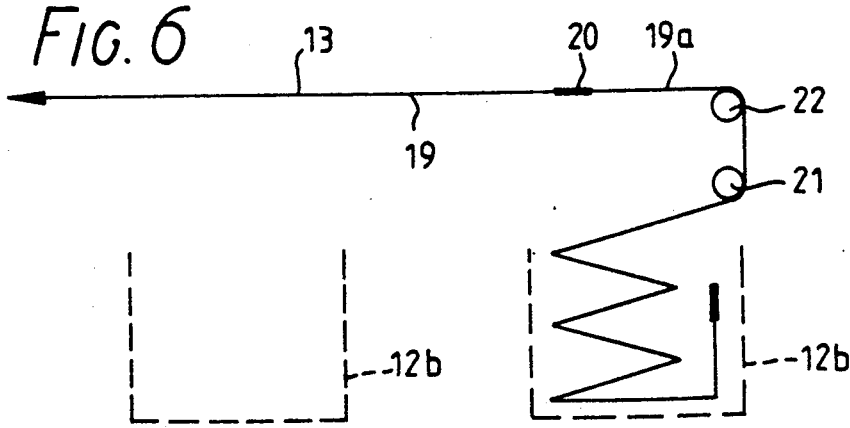

WEB SUPPLY SYSTEMS

This invention has reference to web supply systems and to ticket issuing/processing machines embodying such web supply systems.

Ticket issuing or other web processing machines are supplied with a web of paper, either blank or preprinted with information common to all tickets to be issued, which web feeds through a printer which prints the information appropriate to the ticket and then the individual ticket is detached from the web and issued to the customer. This invention is particularly concerned with the type of web which is supplied to the processing-/ticket issuing-machine packed in a fanfold manner in a cassette or like container.

When the cassette is empty a new web needs to be fed to the processing/issuing machine and particularly where this machine is coin or token freed and where a supervisor is not always present, the machine needs frequent checking or refilling. Otherwise a loss of revenue results. This is particularly relevant to ticket issuing machines used as car parking ticket issuing machines which are usually in an unsupervised location. Even when a supervisor/operator is continuously with the machine frequent changing of cassettes is undesirable.

An object of this invention is to provide an improved web supply system. It is a further object of the present invention to provide a web supply system whereby a plurality of cassettes containing fanfolded web material can supply a continuous web to an operating/issuing machine from the casettes in sequence.

Accordingly the invention provides a web supply system comprising a plurality of casettes each containing a fanfolded web of material, each cassette having a common web exit and a web entrance, the cassettes being arranged side by side, the leading end of the web of the first (most downstream cassette) being arranged to pass through the exit of that cassette to an operating-/issuing machine and the trailing end of the web of each cassette, except the last (most upstream) cassette extending through the entrance of that cassette and being joined to the leading end of the web from the next adjacent cassette, the web extending in a loop between adjacent cassettes so that the webs from all the cassettes can be supplied as a continuous web to the processing/issuing machine.

This increases the capacity of the web supply system and reduces the need for frequent refilling.

Preferably each cassette is of rectangular sectioned box form having an open top to provide a common entrance and exit at the top of the web stack, the trailing end of the web in each cassette extending from the opposite bottom end of the stack to the first end, and a loop of web extending from the entrance of a downstream cassette and the exit of the adjacent upstream cassette towards the bottom ends of those cassettes.

One embodiment of feed system for a fanfold web in cassettes will now be described, by way of example only with reference to the accompanying drawings of which:

FIG. 1 is a diagrammatic perspective view of two side by side cassettes for holding a fanfolded web and a connecting length of web between two of the cassettes, FIG. 2 is a diagrammatic side view showing the web inside one cassette.

FIG. 3 is a perspective view of two cassettes showing the web positions and

FIGS. 4, 5 and 6 are diagrammatic views illustrating the operation of the web supply system.

Figure 9:
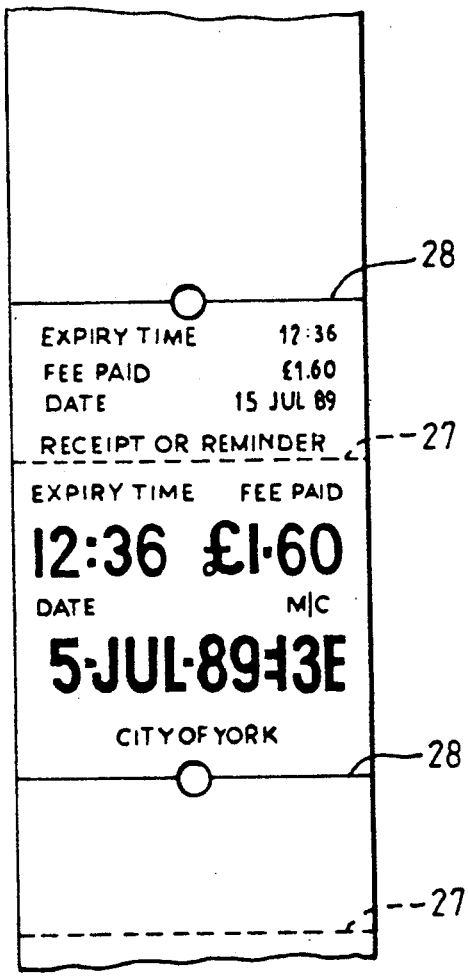

FIGS. 7, 8, 9, and 10 are views showing details.

Referring to the drawings there is shown a plurality of rectangular sectioned box-like cassettes 12, numbered 12a, 12b, respectively, each have a major dimension of height X, eg 295 mms, an intermediate dimension comprising a width Y, eg 70 mms, and a minor dimension comprising a depth Z, eg 275 mms. The dimensions chosen to just accommodate the width of a web of paper 13 of about 68.5 mms width, intended to form a ticket supply web with the tickets positioned at two to view and the web stack having a height of about 265 mms. The web is fan folded in each cassette across the width thereof to form the stack.

As shown in FIG. 1 the cassettes 12a and 12b are arranged side by side with their major dimensioned sides substantially abutting one another and the common entrance and exit of adjacent cassettes 12a, 12b substantially in line. At a first end 14, at the top of the stack as shown, each cassette is formed with an open top to provide a common exit and entrance opening 15. The web 13 passes through one side of the open top 15 serving as the exit opening to a ticket issuing machine. The web 13 also passes at the opposite side of the open top serving as an entrance opening 18 through which the trailing end 19 of the web extends. The trailing end first passes from the bottom of the stack, up the side of the stack within the cassette, and then through the entrance opening 15. The trailing end 19 of the web 13 in the first cassette 12a is joined to the leading end 19a of the web of the other cassette 12b immediately upstream of the leading end of the trailing web 16 by a joint preferably an adhesive joint 20 and between the common entrance and exit the web extends in a loop 17 through substantially the height of the cassettes (see FIG. 1). The trailing end 19 of the leading web 13 being joined to the leading end 19a of the trailing web 13 pulls the trailing web to a position where the trailing web leads directly into the printer mechanism of the ticket issuing machine. This provides a travel of web 13 between adjacent cassettes of just less than twice the height of the cassettes and at the same time accommodates a movement of the web from the plane of one cassette to the plane of the next adjacent cassette, this movement being little greater than the width of the web. The angle of the web in the loop to the major dimension (height) of the cassettes is thus small which reduces any tendency for jamming or tearing of the web as it leaves or enters a cassette.

As shown in FIG. 3 the leading ticket 19a of the trailing web 13 is joined in a loop over a spacer bar 21 to the trailing end 19 of the leading web.

The spacer bar 21 is located at a height of about 60 mms over the open top 15 of the cassette 12a comprising the exit and entrance opening 15 and positioned transversely to the direction of feed of the web 13. The space bar 15 shown is straight but it may be bowed outwardly to maintain the ticket web flat as it is fed over the spacer bar 21.

As shown in FIGS. 3 and 4 the leading end 19a of the trailing web 13 is fed out of the ticket casette 12b upwardly over and around the spacer bar 21 and is adhesively secured to the trailing end 19 of the leading web 13 in the cassette 12a. The leading end of the leading web 13 is fed out of the cassette over a second spacer bar 22, which may be straight or outwardly bowed into the printer mechanism of the ticket issuing machine.

As the printer prints on the ticket web 13 the web is pulled out of the cassette 12a until the web in that cassette is substantially exhausted (see FIG. 5). At this position the loop 17 is pulled out straight to the position shown in FIG. 6 when the web 13 is pulled out of the cassette 12b.

When the supervisor inspects the machine with the web 13 exhausted from the cassette 12a he/she inserts a fresh cassette into the machine and joins the leading end of the web of the new cassette (new cassette 12b) on to the trailing end of the web 13 in the cassette in the machine (now cassette 12a) and so that issue of tickets may continue.

The spacer bars 21, 22 may form part of the printer mechanism of the ticket issuing machine. With this arrangement the web is continuous from one cassette to the next.

Usually the trailing and leading ends of the webs in adjacent cassettes are joined by providing an area of self adhesive for example at the trailing end of each web but a continuous web can be packed into a plurality of cassettes initially.

The web supply system is intended primarily but not exclusively to ticket webs of thermal paper that is paper which leaves a mark when subjected to heat as by a wire printer in order to build up a representation of a character or digit by the formation of a matrix of marks. A web of thermal paper of a thickness of 0.003 mms and having a width of 200 mms and a weight of 68.5/70 grams has been found to be suitable.

FIG. 7 shows the side of a cassette with an aperture in the base to accommodate for a sensing switch (not shown) to give a warning when the web is exhausted and FIG. 8 shows a ticket web in a cassette with the web loaded "three to view".

FIG. 9 is a view of a part of a ticket web 13 with tear off perforation lines 28 (or cut lines) to separate one ticket length from the adjacent ticket length intended for use in a car park. Information as to the issuing authority is preprinted on the ticket with headings such as the Expiry Time, Fee Paid etc. The ticket machine prints information as to the date of issue of the ticket, details of the time of expiry of the parking facility and the fee paid. The tear off perforation line 27 enables the customer to separate the ticket into two parts one part for displaying the ticket in the car and the other part to remind him of the time of expiry of the parking facility.

Figure 10:
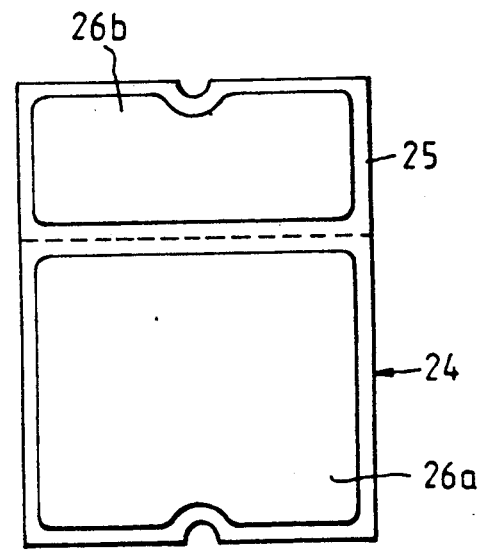

FIG. 10 shows an adhesive sticker 24 suitable to join the leading end of a trailing web to the trailing end of a leading web. The sticker comprises a length of paper 25 with an adhesive applied to one face and covered by barrier coating patches 26a, 26b. The larger area with the barrier patch 26a removed is intended to be supplied to the trailing end of the leading web 13 and the smaller area to be applied with the barrier patch removed to the leading end of the trailing web.

The invention extends to a ticket issuing machine including a continuous web supply as described.

We claim:

1. A web supply system for a ticket issuing machine system comprising a plurality of replaceable cassettes each containing a fan folded web of material comprising a sequence of tickets, each cassette having a web exit and web entrance, the cassettes being arranged side by side and the leading end of a first of the webs having connecting structure and being arranged to pass through the exit of that cassette for processing in an operating/ticket issuing machine and the trailing end of the web of each cassette (except the last) extending through the entrance of that cassette and being joined by mating connecting structure to the leading end of the web from the next adjacent cassette forming a composite web extending in a loop between adjacent cassettes, said loop passing around means exterior to the cassettes so that the composite web from all the cassettes can be supplied as a continuous web to process the sequences of tickets in the processing/ticket issuing machine.

2. A system according to claim 1 in which each cassette is of rectangular sectioned box form having ann open end top to provide a common entrance and exit, the trailing end of the fanfolded web in each cassette extending from the opposite second end to the first end and including a loop of web extending from the entrance of a downstream cassette and the exit of an upstream cassette towards the second ends of those cassettes.

3. A system according to claim 1 in which the guide means is positioned to provide a lengthwise travel of the web between adjacent cassettes which is greater than the major dimension of the cassettes.

4. A system according to claim 3 in which the lengthwise travel of the web in the loop between cassettes is nearly twice the height of the stack of web in each cassette.

5. A system according to claim 1 wherein the guide means comprises a pair of transverse spacer bars.

6. A system according to claim 5 wherein the spacer bars are straight or bowed outwardly.

7. A system according to claim 1 in which the cassettes have a major dimension corresponding substantially to the height of the stack of web therein, an intermediate dimension substantially corresponding to the length of each strip of web between a fold, a minor dimension substantially corresponding too the width of the web and in which the cassettes are arranged side by side with the major sides of adjacent cassettes substantially abutting one another.

8. The web supply system of claim 1 coupled to a ticket issuing machine.

* * * * *